United States Patent
Bigi et al.

(10) Patent No.: US 12,221,514 B2
(45) Date of Patent: Feb. 11, 2025

(54) PROCESS FOR PURIFYING POLYETHER POLYOLS

(71) Applicant: Dow Global Technologies LLC, Midland, MI (US)

(72) Inventors: Marinus A. Bigi, Pearland, TX (US); Arjun Raghuraman, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 538 days.

(21) Appl. No.: 17/596,357

(22) PCT Filed: Jul. 29, 2020

(86) PCT No.: PCT/US2020/043936
§ 371 (c)(1),
(2) Date: Dec. 8, 2021

(87) PCT Pub. No.: WO2021/021845
PCT Pub. Date: Feb. 4, 2021

(65) Prior Publication Data
US 2022/0227929 A1 Jul. 21, 2022

Related U.S. Application Data

(60) Provisional application No. 62/881,696, filed on Aug. 1, 2019.

(51) Int. Cl.
| | |
|---|---|
| *C08G 65/30* | (2006.01) |
| *B01J 31/02* | (2006.01) |
| *C08G 18/48* | (2006.01) |
| *C08G 65/26* | (2006.01) |

(52) U.S. Cl.
CPC .......... *C08G 65/30* (2013.01); *B01J 31/0225* (2013.01); *C08G 18/48* (2013.01); *C08G 65/2645* (2013.01)

(58) Field of Classification Search
CPC .... C08G 65/30; C08G 18/48; C08G 65/2645; B01J 31/0225
See application file for complete search history.

(56) References Cited

U.S. PATENT DOCUMENTS

| | | |
|---|---|---|
| 4,110,268 A | 8/1978 | Longley et al. |
| 4,507,475 A | 3/1985 | Straehle et al. |
| 5,095,061 A | 3/1992 | Chavez, Jr. et al. |
| 5,468,839 A | 11/1995 | Suppes et al. |
| 6,093,793 A | 7/2000 | Hofmann et al. |
| 6,504,062 B2 | 1/2003 | Brons et al. |
| 10,435,502 B2 | 10/2019 | Raghuraman et al. |
| 2004/0064001 A1 | 4/2004 | Ehlers et al. |
| 2005/0267279 A1 | 12/2005 | Suzuki et al. |
| 2012/0078018 A1 | 3/2012 | De Mars |
| 2015/0197665 A1 | 7/2015 | Hsieh et al. |
| 2018/0273676 A1 | 9/2018 | Raghuraman et al. |
| 2019/0309120 A1 | 10/2019 | Nobukuni et al. |

FOREIGN PATENT DOCUMENTS

| | | |
|---|---|---|
| JP | 2009227978 | 10/2009 |
| JP | 2010077417 | 4/2010 |
| JP | 05214489 | 6/2013 |
| JP | 2014129519 | 7/2014 |
| JP | 05763734 | 8/2015 |

OTHER PUBLICATIONS

Tonhauser, "Branched Acid-Degradable, Bicompatible Polyether Copolymers via Anionic Ring-Opening Polymerization Using an Epoxide Inimer", American Chemical Society, 2012, vol. 1, pp. 1094-1097.

*Primary Examiner* — Rabon A Sergent

(57) ABSTRACT

A process for purifying a polyether polyol including treating the polyether polyol with a mixture of: (i) a sulfonic acid catalyst, wherein the catalyst includes a substituted or unsubstituted alkyl group of at least 6 carbon atoms, and (ii) water to reduce residual levels of acetal linkages present in the polyether polyol; a purified polyether polyol prepared using the above treatment process; and a polyurethane product prepared by reacting the above purified polyether polyol and an isocyanate.

10 Claims, 1 Drawing Sheet

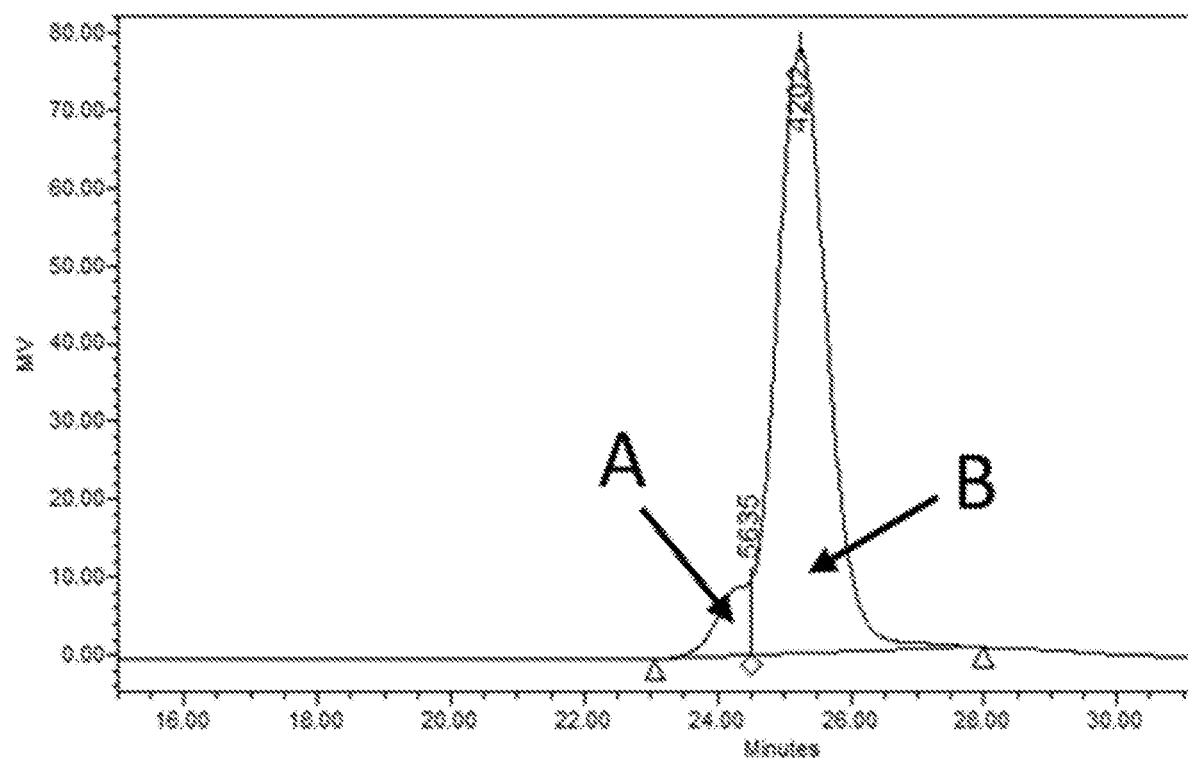

PROCESS FOR PURIFYING POLYETHER POLYOLS

FIELD

Embodiments relate to a process for purifying polyether polyols. More specifically, exemplary embodiments relate to a process of treating a polyether polyol with a sulfonic acid catalyst to reduce residual levels of acetal linkages present in the polyether polyol.

INTRODUCTION

In Lewis acid-catalyzed ring-opening polymerization reactions of alkylene oxides, aldehydes are unavoidably produced as minor side-products. The presence of aldehydes is known to those skilled in the art to lead to condensation reactions with polyols, resulting in the production of side-product polyether acetal polyols. The presence of these polyether acetal polyols in polyether polyols may, in certain applications, be undesirable because such acetals generate bimodal molecular weight distributions skewed toward higher molecular weights. Additionally, hydrolysis of the polyether acetal polyols may release aldehydes in the end-use application, and such release of aldehydes will lead to an undesirable odor.

Many prior art references describe acid finishing of polyols wherein such polyols have been produced using well known basic alkoxylation catalysts. For example, U.S. Pat. No. 5,095,061 describes a process for reducing the concentration of alkenyl end groups in polyols by treatment of neutralized polyols with acid catalysts and water. Similarly, U.S. Pat. No. 6,504,062 describes the manufacture of low odor polyether polyols by acid finishing of un-neutralized (i.e., basic) polyols. Excess acid is added to the polyol to neutralize the residual basic alkoxylation catalyst and generate free acid capable of catalyzing hydrolysis of alkenyl end groups and cyclic ether impurities in the presence of water. In each case, polyols produced with basic alkoxylation catalysts are treated with acid catalysts and water to hydrolyze side-products produced by the basic alkoxylation catalyst. However, only a few prior art references describe acid finishing of polyols wherein such polyols have been produced using Lewis acids.

For example, JP05763734B2 describes manufacturing low odor polyether polyols using Lewis acidic alkoxylation catalysts, followed by acid finishing. The above reference describes using water and a residual Lewis acidic alkoxylation catalyst and, optionally, an additional Lewis acid or Brønsted acid catalyst for the acid finishing process. The above reference discloses that appropriate Brønsted acids used in the process include sulfuric acid, hydrochloric acid, phosphoric acid, and alkylsulfonic acid with phosphoric acid being exemplary as the Brønsted acid used. However, the above reference does not teach whether the mixtures of water and polyether polyol are monophasic or biphasic under the conditions of the acid finishing process. Furthermore, although the above reference specifies an autoclave in the examples described in the reference, the reference does not teach how effective mixing of the reaction mixture is achieved. Under biphasic conditions resulting from the incompatibility of polyol and water, ineffective mixing of polyol and water in the presence of a Lewis acid catalyst and, optionally, a Brønsted acid catalyst, may lead to incomplete acid finishing and/or may require extended treatment time. In addition, although sulfuric acid, hydrochloric acid, phosphoric acid, and alkylsulfonic acid are defined as suitable Brønsted acid catalysts in the above reference, the reference describes only a single example using phosphoric acid.

SUMMARY

Embodiments are directed to a process for purifying a polyether polyol, said polyol being produced with a Lewis acid alkoxylation catalyst, to reduce residual levels of acetal linkages present in the polyether polyol. In one general embodiment, the process includes purifying a polyether polyol by treating the polyether polyol with a mixture of: (i) a sulfonic acid catalyst, wherein the catalyst includes a carbon atom chain length of at least 6 carbon atoms, for example, a catalyst including a substituted or unsubstituted alkyl group of at least 6 carbon atoms to 18 carbon atoms (C6 to C18); and (ii) water to reduce residual levels of acetal linkages present in the polyether polyol. In an exemplary embodiment, the polyether polyol can be treated with (i) a C6 to C18 alkylsulfonic acid or a C6 to C18 alkylated arylsulfonic acid catalyst and (ii) water to form a biphasic polyol and water mixture and to reduce residual levels of acetal linkages present in the polyether polyol.

It has been discovered that, in some embodiments, a treatment of a biphasic mixture of polyether polyol and water with a C6 to C18 alkylsulfonic acid or C6 to C18 alkylated arylsulfonic acid catalyst at temperatures of between 60° C. and 140° C.; and at C6 to C18 alkylsulfonic acid or C6 to C18 alkylated arylsulfonic acid catalyst concentrations of less than (<) 0.005 mol sulfonic acid per kg of polyether polyol, leads to acetal linkage hydrolysis with a required reaction time of <30 minutes (min). In some embodiments, for example at temperatures between 80° C. and 140° C. and sulfonic acid concentrations of <0.005 mol sulfonic acid per kg of polyether polyol, acetal hydrolysis requires a reaction time of less than or equal to (≤) 5 min.

Advantageously, a reduced reaction time leads to a reduced concentration of undesirable side-products formed from the condensation reaction of propionaldehyde produced during the hydrolysis reaction. Compared to sulfonic acids lacking the C6 to C18 alkyl substitution, the present invention teaches that the exemplary Brønsted acid catalysts, C6 to C18 alkylsulfonic acids or C6 to C18 alkylated arylsulfonic acids, reduce the reaction time required for the hydrolysis reaction to reach completion by at least 20%. The improved hydrolysis rates of the present invention process advantageously lead to reduced cycle times in the process, and facilitate production of higher volumes of acid-finished polyols. The improved hydrolysis rates are an unexpected result because C6 to C18 alkylsulfonic acids and C6 to C18 alkylated arylsulfonic acids are not significantly more acidic than other sulfonic acids lacking the C6 to C18 alkyl substitution.

BRIEF DESCRIPTION OF THE DRAWINGS

FIG. 1 is a graphical illustration of a GPC chromatogram showing two peaks one peak representing the concentration of component A (generally indicated by arrow A) and the other peak representing the concentration of component B (generally indicated by arrow B), wherein component A is an undesirable polyether acetal polyol component and component B is a desirable polyether polyol product component.

DETAILED DESCRIPTION

As used throughout this specification, the abbreviations given below have the following meanings, unless the context clearly indicates otherwise: μm=micron(s); g=gram(s); mg=milligram(s); L=liter(s); mL=milliliter(s); ppm=parts per million; ppmw=parts per million by weight; rpm=revolutions per minute; m=meter(s); mm=millimeter(s); cm=centimeter(s); min=minute(s); s=second(s); hr=hour(s); ° C.=degree(s) Celsius; %=percent, vol %=volume percent; and wt %=weight percent.

The term "polyether polyol" refers to the reaction product formed from the addition of epoxides to compounds containing active hydrogen atoms.

The term "polyether acetal polyol" refers to a polyether polyol containing linear acetal linkages as represented by the following general Formula (I):

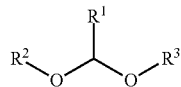

Formula (I)

wherein $R^1$ is an alkyl group, and $R^2$ and $R^3$ represent polyether chains with the following general Formula (II):

$$[OCH(R^4)CH_2]_n \quad (II)$$

wherein $R^4$ is H or an alkyl group and n is an integer.

The term "C6 to C18 alkylsulfonic acid or C6 to C18 alkylated arylsulfonic acid" herein means acid catalysts containing sulfonic acids and substituted or unsubstituted alkyl groups of 6 carbons to 18 carbons.

The term "alkylsulfonic acid" herein means sulfonic acid catalysts containing substituted or unsubstituted alkyl groups.

The term "arylsulfonic acid" herein means sulfonic acid catalysts containing substituted or unsubstituted aryl groups, including phenyl groups, naphthyl groups, and the like.

Production of Polyether Polyol

The process of producing a polyether polyol is a well-known process and is described in several references including, for example, U.S. Pat. Nos. 9,896,542, 7,378,559, and 5,374,705. Generally, the steps of producing a polyether polyol include: (1) feeding into a reactor an initiator having a nominal hydroxyl functionality of at least 1; (2) feeding into the reactor, one or more monomers such as alkylene oxide; (3) feeding into the reactor, a polymerization catalyst such as a Lewis acid catalyst; (4) optionally, separate from feeding the initiator into the reactor, feeding a hydrogen bond acceptor additive into the reactor; and (5) allowing the initiator to react with the one or more monomers in the presence of the polymerization catalyst and, optionally the hydrogen bond acceptor additive to form a polyether polyol. Embodiments relate to further purifying the resultant polyether polyol, e.g., to reduce residual levels of acetal linkages present in the polyether polyol.

In exemplary embodiment, the polymerization catalyst is a Lewis acid polymerization catalyst. For example, the Lewis acid polymerization catalyst has the following general Formula (III):

$$M(R^1)_1(R^2)_1(R^3)_1(R^4)_{0 \text{ or } 1} \quad (III)$$

whereas M is boron, aluminum, indium, bismuth or erbium; $R^1$ includes (e.g., consists of) a first fluoro/chloro or fluoroalkyl-substituted phenyl group; $R^2$ includes (e.g., consists of) a second fluoro/chloro or fluoroalkyl-substituted phenyl group; $R^3$ includes (e.g., consists of) a third fluoro/chloro or fluoroalkyl-substituted phenyl group or a first functional group or functional polymer group; and optional $R^4$ is (e.g., consists of) a second functional group or functional polymer group.

As used herein, by "fluoro/chloro or fluoroalkyl-substituted phenyl group" it is meant a fluoro/chloro substituted phenyl group or fluoroalkyl-substituted phenyl group, as described below, is present. By "fluoroalkyl-substituted phenyl group" it is meant a phenyl group that includes a least one hydrogen atom replaced with a fluoroalkyl group. By "fluoro-substituted phenyl group" it is meant a phenyl group that includes at least one hydrogen atom replaced with a fluorine atom. By "chloro-substituted phenyl group" it is meant a phenyl group that includes at least one hydrogen atom replaced with a chlorine atom. By "fluoro/chloro substituted phenyl group" it is meant a phenyl group that includes at least one hydrogen atom replaced with a fluorine or chlorine atom, whereas the phenyl group can include a combination of fluorine and chlorine atom substituents.

In the general Formula (III), $R^1$, $R^2$, and $R^3$ may each independently include the fluoro/chloro or fluoroalkyl-substituted phenyl group or may each independently consist essentially of the fluoro/chloro or fluoroalkyl-substituted phenyl group. The M in the general Formula (III) may exist as a metal salt ion or as an integrally bonded part of the Formula (III).

With respect to $R^3$ and optional $R^4$, the functional group or functional polymer group may be (1) a Lewis base that forms a complex with the Lewis acid catalyst (e.g., a boron-based Lewis acid catalyst); and/or (2) a molecule or moiety that contains at least one electron pair that is available to form a dative bond with a Lewis acid. The Lewis base may be a polymeric Lewis base. By "functional group" or "functional polymer group" it is meant a molecule that contains at least one of the following: water, an alcohol, an alkoxy (examples include a linear or branched ether and a cyclic ether), a ketone, an ester, an organosiloxane, an amine, a phosphine, an oxime, and substituted analogs thereof. Each of the alcohol, linear or branched ether, cyclic ether, ketone, ester, alkoxy, organosiloxane, and oxime may include, for example, from 2 carbon atoms to 20 carbon atoms in one embodiment, from 2 carbon atoms to 12 carbon atoms in another embodiment, from 2 carbon atoms to 8 carbon atoms in still another embodiment, and/or from 3 carbon atoms to 6 carbon atoms in yet another embodiment.

For example, the functional group or functional polymer group may have the general formula (OYH)n, whereas O is O oxygen, H is hydrogen, Y is H or an alkyl group, and n is an integer (e.g., an integer from 1 to 100). However, other known functional polymer groups combinable with a Lewis acid catalyst, such as a boron-based Lewis acid catalyst, may be used. Exemplary cyclic ethers include tetrahydrofuran and tetrahydropyran. Polymeric Lewis bases are moieties containing two or more Lewis base functional groups such as polyols and polyethers based on polymers of ethylene oxide, propylene oxide, and butylene oxide. Exemplary polymeric Lewis bases include ethylene glycol, ethylene glycol methyl ether, ethylene glycol dimethyl ether, diethylene glycol, diethylene glycol dimethyl ether, triethylene glycol, triethylene glycol dimethyl ether, polyethylene glycol, polypropylene glycol, and polybutylene glycol.

Without intending to be bound by this theory, certain $R^4$ may help improve shelf life of the catalyst, e.g., without significantly compromising catalyst activity when utilized in a polymerization reaction. For example, the catalyst comprising M, $R^1$, $R^2$, and $R^3$ may be present in the form with the optional $R^4$ (form $M(R^1)_1(R^2)_1(R^3)_1(R^4)_1$) or without the optional $R^4$ (form $M(R^1)_1(R^2)_1(R^3)_1$). Suitable $R^4$ groups that can help increase catalyst shelf stability, e.g., without compromising catalyst activity, include diethyl ether, cyclopentyl methyl ether, methyl tertiary-butyl ether, tetrahydrofuran, 2-methyltetrahydrofuran, tetrahydropyran, 1,4-dioxane, acetone, methyl isopropyl ketone, isopropyl acetate, and isobutyl acetate.

According to exemplary embodiments, the Lewis acid catalyst is a boron based Lewis acid catalyst that has the general formula $B(R^1)_1(R^2)_1(R^3)_1(R^4)_{0\ or\ 1}$, whereas $R^1$, $R^2$, and $R^3$ are each independently a fluoro-substituted phenyl group, and optional $R^4$ is the functional group or functional polymer group.

According to exemplary embodiments, the Lewis acid catalyst has the general formula $M(R^1)_1(R^2)_1(R^3)_1(R^4)_{0\ or\ 1}$, whereas M is boron, aluminum, indium, bismuth, or erbium, $R^1$, $R^2$, and $R^3$ are each a fluoroalkyl-substituted phenyl group, and optional $R^4$ is the functional group or functional polymer group discussed above. The M in the general formula may exist as a metal salt ion or as an integrally bonded part of the formula. $R^1$, $R^2$, and $R^3$ may each be an independent fluoroalkyl-substituted phenyl group. For example, $R^1$, $R^2$, and $R^3$ may each be the same fluoroalkyl-substituted phenyl group. $R^1$, $R^2$, and $R^3$ may include the fluoroalkyl-substituted phenyl group or may consist essentially of the fluoroalkyl-substituted phenyl group. Similarly, $R^4$ may include the functional group or functional polymer group, or consist essentially of the $R^4$ is the functional group or functional polymer group. With respect to $R^1$, $R^2$, and $R^3$, by fluoroalkyl-substituted phenyl group it is meant a phenyl group that includes at least one hydrogen atom replaced with a fluoroalkyl group, which is an alkyl group with at least one hydrogen atom replaced with a fluorine atom. For example, the fluoroalkyl group may have the structure $C_nH_mF_{2n+1-m}$, whereas n is greater than or equal to 1 and less than or equal to 5. Also, m is a number that reflects a balance of the electrical charges to provide an overall electrostatically neutral compound, e.g., can be zero, one or greater than one.

The phenyl group of the fluoroalkyl-substituted phenyl may be substituted to include other groups in addition to the at least one fluoroalkyl group, e.g., a fluorine atom and/or chlorine atom that replaces at least one hydrogen of the phenyl group. For example, $R^1$, $R^2$, and $R^3$ may be a fluoro/chloro-fluoroalkyl-substituted phenyl group (meaning one fluoro or chloro group and at least one fluoroalkyl group are substituted on the phenyl group), difluoro/chloro-fluoroalkyl-substituted phenyl group (meaning two fluoro, two chloro, or a fluoro and chloro groups and at least one fluoroalkyl group are substituted on the phenyl group), trifluoro/chloro-fluoroalkyl-substituted phenyl group (meaning three fluoro, three chloro, or a combination of fluoro and chloro groups totaling three and at least one fluoroalkyl group are substituted on the phenyl group), or tetrafluoro/chloro-fluoroalkyl-substituted phenyl group (meaning four fluoro, four chloro, or a combination of fluoro and chloro groups totaling four and one fluoroalkyl group are substituted on the phenyl group). The functional group or functional polymer group $R^4$, if present, may be as a Lewis base that forms a complex with the Lewis acid catalyst (e.g., a boron-based Lewis acid catalyst) and/or a molecule or moiety that contains at least one electron pair that is available to form a dative bond with a Lewis acid, as discussed above.

According to other exemplary embodiments, the Lewis acid catalyst has the general formula $M(R^1)_1(R^2)_1(R^3)_1(R^4)_{0\ or\ 1}$, whereas M is boron, aluminum, indium, bismuth or erbium, $R^1$ includes a first fluoroalkyl-substituted phenyl group, $R^2$ includes a second fluoroalkyl-substituted phenyl group or a first fluoro-substituted phenyl group or a chloro-substituted phenyl group (i.e., a fluoro/chloro or fluoroalkyl-substituted substituted phenyl group), $R^3$ includes a third fluoroalkyl-substituted phenyl group or a second fluoro-substituted phenyl group or a chloro-substituted phenyl group (i.e., a fluoro/chloro or fluoroalkyl-substituted substituted phenyl group), and optional $R^4$ is the functional group or functional polymer group. The M in the general formula may exist as a metal salt ion or as an integrally bonded part of the formula. $R^1$, $R^2$, $R^3$ and $R^4$ are each independent of each other, e.g., a fluoroalkyl-substituted phenyl group of $R^1$ may be the same as or different from a fluoroalkyl-substituted phenyl group of $R^2$. Though, $R^1$ is different from at least one of $R^2$ and $R^3$, such that each of $R^1$, $R^2$, and $R^3$ are not all the same (e.g., same fluoroalkyl-substituted phenyl group), but $R^1$ may or may not be the same as $R^2$ or $R^3$.

$R^1$ may include the first fluoroalkyl-substituted phenyl group or may consist essentially of the first fluoroalkyl-substituted phenyl group. Similarly, $R^2$ may include the second fluoroalkyl-substituted phenyl group or the first fluoro/chloro-substituted phenyl group, or consist essentially of the second fluoroalkyl-substituted phenyl group or the first fluoro/chloro-substituted phenyl group. Similarly, $R^3$ may include the third fluoroalkyl-substituted phenyl group or the second fluoro/chloro-substituted phenyl group, or consist essentially of the third fluoroalkyl-substituted phenyl group or the second fluoro/chloro-substituted phenyl group. Similarly, $R^4$ may include the functional group or functional polymer group, or consist essentially of the $R^4$ is the functional group or functional polymer group.

With respect to $R^1$, $R^2$, and $R^3$, by fluoroalkyl-substituted phenyl group it is meant a phenyl group that includes at least one hydrogen atom replaced with a fluoroalkyl group, which is an alkyl group with at least one hydrogen atom replaced with a fluorine atom. For example, the fluoroalkyl group may have the structure $C_nH_mF_{2n+1-m}$, whereas n is greater than or equal to 1 and less than or equal to 5. Also, m is a number that reflects a balance of the electrical charges to provide an overall electrostatically neutral compound, e.g., can be zero, one or greater than one. The phenyl group of the fluoroalkyl-substituted phenyl may be substituted to include other groups in addition to the at least one fluoroalkyl group, e.g., a fluorine atom and/or chlorine atom that replaces at least one hydrogen of the phenyl group. For example, $R^1$, $R^2$, or $R^3$ may be a fluoro/chloro-fluoroalkyl-substituted phenyl group (meaning one fluoro or chloro group and at least one fluoroalkyl group are substituted on the phenyl group), difluoro/chloro-fluoroalkyl-substituted phenyl group (meaning two fluoro, two chloro, or a fluoro and chloro group and at least one fluoroalkyl group are substituted on the phenyl group), trifluoro/chloro-fluoroalkyl-substituted phenyl group (meaning three fluoro, three chloro, or a combination of fluoro and chloro groups totaling three and at least one fluoroalkyl group are substituted on the phenyl group), or tetrafluoro/chloro-fluoroalkyl-substituted phenyl group (meaning four fluoro, four chloro, or a combination of fluoro and chloro groups totaling four and one fluoroalkyl group are substituted on the phenyl group).

With respect to $R^2$ and $R^3$, by fluoro-substituted phenyl group it is meant a phenyl group that includes at least one hydrogen atom replaced with a fluorine atom. By chloro-substituted phenyl group it is meant a phenyl group that includes at least one hydrogen atom replaced with a chlorine atom. The phenyl group of the fluoro/chloro-substituted phenyl group may be substituted with other groups (such as may include a combination of fluoro, chloro, and/or hydrogens), but excludes any fluoroalkyl groups (e.g., excludes the group having the structure $C_nH_mF_{2n+1-m}$ discussed above). Accordingly, the fluoro/chloro-substituted phenyl group is differentiated from the fluoroalkyl-substituted phenyl group, by the exclusion of any fluoroalkyl groups substituted on the phenyl ring. With respect to optional $R^4$, the functional group or functional polymer group may be a Lewis base that forms a complex with the Lewis acid catalyst (e.g., a boron-based Lewis acid catalyst) and/or a molecule or moiety that contains at least one electron pair that is available to form a dative bond with a Lewis acid, as discussed above.

With respect to the above, exemplary embodiments may utilize a blend of catalyst, e.g., using one or more of the catalysts structures above. The Lewis acid catalyst used in exemplary embodiments may be a blend catalyst that includes one or more Lewis acid catalysts (e.g., each having the general formula $B(R^1)_1(R^2)_1(R^3)_1(R^4)_{0\ or\ 1}$) and optionally at least one other catalyst (e.g., such as catalysts known in the art for producing polyether polyols). The blend catalyst may optionally include other catalysts, in which the one or more Lewis acid catalysts having the general formula $B(R^1)_1(R^2)_1(R^3)_1(R^4)_{0\ or\ 1}$ account for at least 25 wt %, at least 50 wt %, at least 70 wt %, at least 75 wt %, at least 80 wt %, at least 85 wt %, at least 90 wt %, at least 95 wt %, at least 99 wt %, etc., of the total weight of the blend catalyst. The added blend catalyst may include or exclude any DMC based catalysts. Exemplary other metal based Lewis acids that are active at lower temperatures may be included as part of the dual catalyst system and/or the blend catalyst. Exemplary metal-based Lewis acids are based on one of aluminum, boron, copper, iron, silicon, tin, titanium, zinc, and zirconium.

Purification Process

Upon completion of the reaction process for producing the polyether polyol product as described above, acetal linkages are formed in the polyether polyol and such acetal linkages may need to be removed from the polyether polyol to obtain a purified polyether polyol for use in various applications requiring a purified polyether polyol. Therefore, in one broad embodiment, the present invention includes a process for purifying the polyether polyol to reduce residual levels of acetal linkages present in the polyether polyol, the process including treating a mixture of polyether polyol and water with a C6 to C18 alkylsulfonic acid or C6 to C18 alkylated arylsulfonic acid catalyst.

In an exemplary embodiment, the chemical structure of the sulfonic acid catalyst can include, for example, the following general chemical structure:

wherein $R^5$ represents a substituted or unsubstituted alkyl group of 6 carbon atoms to 18 carbon atoms.

In another exemplary embodiment, the chemical structure of the sulfonic acid catalyst can include, for example, the following general chemical structure:

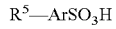

wherein $R^5$ represents a substituted or unsubstituted alkyl group of 6 carbon atoms to 18 carbon atoms and Ar represents a substituted or unsubstituted aryl group, including for example, phenyl, naphthyl, and the like.

The C6 to C18 alkylsulfonic acid or C6 to C18 alkylated arylsulfonic acid catalyst, component (i), useful in the present invention can include one or more compounds, including, for example, hexylbenzene sulfonic acid, octylbenzene sulfonic acid, decylbenzene sulfonic acid, dodecylbenzene sulfonic acid, hexanesulfonic acid, octanesulfonic acid, decanesulfonic acid, dodecanesulfonic acid, tetradecanesulfonic acid, hexadecanesulfonic acid, octadecanesulfonic acid, and mixtures thereof.

In one exemplary embodiment, the sulfonic acid catalyst useful in the present invention can be dodecylbenzene sulfonic acid and mixtures of dodecylbenzene sulfonic acid with other sulfonic acids.

The concentration of the sulfonic acid, component (i), useful in the process of the present invention includes, for example, from 0.0001 mol sulfonic acid per kg of polyether acetal polyol to 0.005 mol sulfonic acid per kg of polyether polyol in one embodiment, from 0.0001 mol sulfonic acid per kg of polyether polyol to 0.0025 mol sulfonic acid per kg of polyether polyol in another embodiment, and from 0.0001 mol sulfonic acid per kg of polyether polyol to 0.001 mol sulfonic acid per kg of polyether polyol in still another embodiment.

Water, component (ii), used in the present invention can include, for example, deionized water. In general, the concentration of water, component (ii), useful in the process of the present invention includes, for example, from 0.1 wt % to 20 wt % in one embodiment, from 0.5 wt % to 10 wt % in another embodiment, and from 0.5 wt % to 5.0 wt % in still another embodiment.

As aforementioned, the present invention process for purifying a polyether polyol includes the steps of (A) treating a mixture of (i) a polyether polyol and (ii) water with a C6 to C18 alkylsulfonic acid or C6 to C18 alkylated arylsulfonic acid catalyst; and (B) heating the mixture. The process steps are carried out, for example, at a temperature of from 60° C. to 140° C. in one embodiment, from 80° C. to 120° C. in another embodiment, and from 80° C. to 100° C. in still another embodiment. And, the reaction time of the process steps includes, for example, a reaction time of <30 min in one embodiment; from 1 min to 10 min in another embodiment; and from 1 min to 5 min in still another embodiment.

The purification process of the present invention provides several advantageous properties and/or benefits. For example, the process: (1) allows the use of the use of a low concentration of a C6 to C18 alkylsulfonic acid or a low concentration of a C6 to C18 alkylated arylsulfonic acid catalyst; (2) can be carried out under mild reaction temperatures;

and (3) provides short reaction times.

For example, the C6 to C18 alkylsulfonic acid or C6 to C18 alkylated arylsulfonic acid concentrations used in the process of the present invention include a concentration of from 0.0001 mol sulfonic acid per kg of polyether polyol to 0.005 mol sulfonic acid per kg of polyether polyol in one general embodiment as described above.

For example, the reaction temperatures used in the process of the present invention include a temperature of from 60° C. to 140° C. in one general embodiment as described above.

For example, the reaction times used in the process of the present invention includes, for example, a reaction time of <30 min in one general embodiment as described above.

The resulting polyol product after undergoing the purification treatment of the present invention has a residual concentration of polyether acetal polyol of ≤5.0 wt % in one embodiment, ≤3.0 wt % in another embodiment, and ≤1.0 wt % in still another embodiment. In other embodiments, the residual concentration of polyether acetal polyol is greater than (>) 0.01 wt % in one embodiment, >0.1 wt % in another embodiment, and >1 wt % in still another embodiment. In an exemplary embodiment, the residual concentration of polyether acetal polyol is from 1.0 wt % to 5.0 wt %. The residual concentration of polyether acetal polyol present in the polyether polyol is measured by gel permeation chromatography (GPC).

In one embodiment, the polyether polyol is used in producing a polyurethane product by reacting the polyol with an isocyanate.

EXAMPLES

The following examples are presented to further illustrate the present invention in detail but are not to be construed as limiting the scope of the claims. Unless otherwise indicated, all parts and percentages are by weight.

Various terms and designations used in the Inventive Examples (Inv. Ex.) and the Comparative Examples (Comp. Ex.) are explained as follows:

"PDI" stands for polydispersity index.
"MN" stands for number-average molecular weight.
"Mw" stands for weight-average molecular weight.
"GPC" stands for gel permeation chromatography.
"DBSA" stands for dodecylbenzene sulfonic acid.
"BSA" stands for benzenesulfonic acid.
"Temp." stands for temperature.
"Min" stands for minutes.
"wt %" stands for weight percent, based on total mass of reaction solution.
"RPM" stands for revolutions per minute.
"Pa" stands for Pascals, a unit of pressure.

Various raw materials or ingredients used in the Inventive Examples (Inv. Ex.) and the Comparative Examples (Comp. Ex.) are explained in Table I as follows:

TABLE I

Acids Used in Examples

| Ingredient | Supplier |
|---|---|
| 85% phosphoric acid ($H_3PO_4$) | Fisher Scientific |
| dodecylbenzene sulfonic acid (DBSA) | Aldrich |
| benzene sulfonic acid (BSA) | Aldrich |
| ethanesulfonic acid | Aldrich |
| para-toluene sulfonic acid (pTSA) | Aldrich |
| 4-chlorobenzene sulfonic acid | Aldrich |
| 4-hydroxybenzene sulfonic acid | Aldrich |

Polyether Acetal Polyol Concentration in Polyether Polyol Test Method

The GPC analysis is performed using a High Performance Liquid Chromatography (HPLC) system equipped with an inline vacuum degasser, a liquid autosampler, a binary pump, a thermostated column compartment, a temperature controller, a refractive index (RI) detector, a PLgel 5-μm guard column (50 mm×7.5 mm) and a series of four PLgel 5-μm (300 mm×7.5 mm) narrow porosity analytical columns (e.g., 50 Å; 100 Å; 1,000 Å; and 10,000 Å). Uninhibited tetrahydrofuran (THF) is used as the mobile phase at a flow rate of 1 mL/min while the column and detector temperatures are set to 40° C. The sample is dissolved in mobile phase (~1%) and filtered through a 0.45 μm PTFE membrane. A 100-μL aliquot of the sample solution is injected and analyzed over a 50-minute run time. The sample results are quantitated using Empower Pro against a standard curve comprised of twelve narrowly distributed PEG standards (44000-238 Mp; Sigma-Aldrich (Fluka) ReadyCal Set). The molecular distributions reported here are relative (PEG) values.

With reference to FIG. 1, there is shown a GPC chromatogram with two peaks, generally designated as peak A, and peak B by arrows A and B respectively. In FIG. 1, one peak A represents the concentration of a component A wherein component A is an undesirable polyether acetal polyol component. The other peak B represents the concentration of component B wherein component B is a desirable polyether polyol product component.

The concentration of polyether acetal polyols is quantified by dividing the integrated area of the high molecular weight shoulder (peak A) by the total polyol peak area in the GPC chromatogram (peaks A and B) shown in FIG. 1; and the concentration is reported as parts per hundred (%).

In the following Examples, Polyol A is prepared by the following general procedure: A 1.8-L reactor from Mettler Toledo is used. A Reaction Calorimeter, also from Mettler Toledo, is used to control both temperature and agitation speed of the reactor. The reactor has a thermocouple, a pressure transducer, and an inlet port for propylene oxide addition from a 500D ISCO pump. The reactor also has a separate inlet port, which is used to add first 249 grams of a polyether polyol starter whose number average molecular weight is 700 g/mol. After drying the polyether polyol starter for 1 hr at 130° C., under a nitrogen atmosphere, supplied through the same port used to feed propylene oxide, the temperature is lowered to 50° C. Karl Fischer titration of a 24-gram sample of the dried polyol, which is removed through the bottom port of the reactor, shows that 56 ppm of water remains in the sample. This is followed by four stages of catalyst and propylene oxide addition using the amounts described in Table II. In each stage, another reactor port is used to vent nitrogen until the pressure in the reactor reaches 0 Pa. A syringe is then used to inject a solution in 1 mL THF of catalyst, the THF adduct of bis(3,5-bis(trifluoromethyl) phenyl)(2,4,6-trifluorophenyl)borane, through a septum in a fitting on the same port used to add the polyether polyol starter. After catalyst addition, and venting with nitrogen of the THF in the catalyst solution, the reactor is again allowed to reach 0 Pa, all reactor ports are closed, and propylene addition into the reactor starts at a constant rate of 4 mL/min through a port designated for this purpose. The quantities of catalyst and monomer in the four stages are as described in the following Table II:

TABLE II

| STAGE No. | CATALYST (mg) | MONOMER (mL) |
|---|---|---|
| 1 | 243 | 483 |
| 2 | 250 | 482 |
| 3 | 249 | 483 |
| 4 | 72 | 213 |

Once all of the propylene oxide has been fed to the reactor, the corresponding inlet port for propylene oxide addition is closed, and digestion of the unreacted monomer is allowed to proceed. An amount of 1551 grams of product is collected through the bottom port of the reactor.

TABLE III

Summary of Results for Examples

| Example No. | Acid (mmol) | Polyol A Mass (grams) | Temp. (° C.) | Treatment Time (min) | Water (wt %) | Stirring Rate (rpm) | Polyether Acetal Polyol Area % (by GPC) |
|---|---|---|---|---|---|---|---|
| Comp. Ex. A | none | 9.9 | 100 | 360 | 1.2 | 750 | 6.03 |
| Comp. Ex. B | H₃PO₄ (0.006) | 9.9 | 100 | 360 | 1.2 | 750 | 5.72 |
| Inv. Ex. 1 | DBSA (0.006) | 9.9 | 100 | 5 | 1.2 | 750 | 1.84 |
|  |  |  |  | 30 |  |  | 1.04 |
| Inv. Ex. 2 | DBSA (0.006) | 9.5 | 100 | 5 | 5.2 | 750 | 0.80 |
| Inv. Ex. 3 | DBSA (0.002) | 4.75 | 100 | 5 | 5.2 | 750 | 1.55 |
| Inv. Ex. 4 | DBSA (0.003) | 4.75 | 80 | 5 | 5.2 | 750 | 2.73 |
|  |  |  |  | 30 |  |  | 1.16 |
| Comp. Ex. C | BSA (0.003) | 4.75 | 90 | 5 | 5.2 | 350 | 6.00 |
| Comp. Ex. D | pTSA (0.003) | 4.75 | 90 | 5 | 5.2 | 350 | 5.22 |
| Comp. Ex. E | 4-hydroxybenzene sulfonic acid (0.003) | 4.75 | 90 | 5 | 5.2 | 350 | 6.32 |
| Comp. Ex. F | 4-chlorobenzene sulfonic acid (0.003) | 4.75 | 90 | 5 | 5.2 | 350 | 4.87 |
| Comp. Ex. G | ethanesulfonic acid (0.003) | 4.75 | 90 | 5 | 5.2 | 350 | 6.05 |
| Inv. Ex. 5 | DBSA (0.003) | 4.75 | 90 | 5 | 5.2 | 350 | 1.58 |

Comparative Example A (No Brønsted Acid Used)

In this Comparative Example A, Polyol A (9.9 g) and a 12 mm magnetic stir bar are added to a 20 mL borosilicate glass scintillation vial. The polyol is stirred at 750 rpm and heated in a temperature-controlled aluminum reaction block at 100° C. for 30 min. Next, deionized water is added (0.10 g) to the vial and the polyol-water solution in the vial is capped and stirred at 750 rpm and at 100° C. for 6 hr. A sample from the vial, for GPC analysis, is collected after 6 hr of heating and stirring the polyol solution by briefly removing the vial cap and withdrawing approximately 0.10 g of the polyol solution. The polyol solution sample is diluted with 10.0 g of uninhibited tetrahydrofuran (THF) and filtered through a 0.45 µm polytetrafluoroethylene (PTFE) syringe filter for GPC analysis. The GPC analysis for the value of the Polyether Acetal Polyol Area % is summarized in Table IV.

TABLE IV

GPC Results

| Example No. | Acid (mmol) | Temp. (° C.) | Treatment Time (min) | Water (wt %) | Stirring Rate (rpm) | Polyether Acetal Polyol Area % (by GPC) |
|---|---|---|---|---|---|---|
| Comp. Ex. A | none | 100 | 360 | 1.2 | 750 | 6.03 |

As described in Table IV, water treatment at 100° C. does not reduce the Polyether Acetal Polyol content compared to the initial untreated sample, even after 6 hr of treatment time.

Comparative Example B (Phosphoric Acid Used)

Polyol A (9.9 g) and a 12 mm magnetic stir bar are added to a 20 mL borosilicate glass scintillation vial. The polyol is stirred at 750 rpm and heated in a temperature-controlled aluminum reaction block at 100° C. for 30 min. Next, phosphoric acid is added streamwise as a stock solution in deionized water (0.10 g; stock solution: 14.1 mg 85% phosphoric acid in 2.0 g deionized water) and the polyol solution is capped and stirred at 750 rpm and 100° C. for 6 hr. A GPC sample is collected after 6 hr by briefly removing the vial cap and withdrawing approximately 0.10 g of the polyol. The sample is diluted with 10.0 g uninhibited THF and filtered through a 0.45 µm PTFE syringe filter for GPC analysis. The GPC analysis for the value of the Polyether Acetal Polyol Area % is summarized in Table V.

TABLE V

GPC Results

| Example No. | Acid (mmol) | Temp. (° C.) | Treatment Time (min) | Water (wt %) | Stirring Rate (rpm) | Polyether Acetal Polyol Area % (by GPC) |
|---|---|---|---|---|---|---|
| Comp. Ex. B | H₃PO₄ (0.006) | 100 | 360 | 1.2 | 750 | 5.72 |

As shown in Table V, aqueous phosphoric acid treatment at 100° C. does not reduce the Polyether Acetal Polyol content compared to the initial untreated sample, even after 6 hr of treatment time.

Inventive Example 1

Polyol A (9.9 g) and a 12 mm magnetic stir bar are added to a 20 mL borosilicate glass scintillation vial. The polyol is stirred at 750 rpm and heated in a temperature-controlled aluminum reaction block at 100° C. for 30 min. Next, dodecylbenzene sulfonic acid (DBSA) is added streamwise as a stock solution in water (0.10 g; stock solution: 20.0 mg DBSA and 1.0 g deionized water), and the polyol solution is capped and stirred at 750 rpm and 100° C. for 30 min. GPC samples are collected after 5 min and 30 min by briefly removing the vial cap and withdrawing approximately 0.10 g of the polyol. The samples are diluted with 10.0 g uninhibited THF and filtered through 0.45 µm PTFE syringe filters for GPC analysis. The GPC analysis for the value of the Polyether Acetal Polyol Area % after 5 min and after 30 min is summarized in Table VI.

TABLE VI

GPC Results

| Example No. | Acid (mmol) | Temp. (° C.) | Treatment Time (min) | Water (wt %) | Stirring Rate (rpm) | Polyether Acetal Polyol Area % (by GPC) |
|---|---|---|---|---|---|---|
| Inv. Ex. 1 | DBSA (0.006) | 100 | 5<br>30 | 1.2 | 750 | 1.84<br>1.04 |

As shown in Table VI, DBSA treatment at 100° C. reduces the Polyether Acetal Polyol content compared to the initial untreated sample.

Inventive Example 2

Polyol A (9.5 g) and a 12 mm magnetic stir bar are added to a 20 mL borosilicate glass scintillation vial. The polyol is stirred at 750 rpm and heated in a temperature-controlled aluminum reaction block at 100° C. for 30 min. Next, dodecylbenzene sulfonic acid (DBSA) is added streamwise as a stock solution in water (0.50 g; stock solution: 20.0 mg DBSA and 5.0 g deionized water), and the polyol solution is capped and stirred at 750 rpm and 100° C. for 5 min.

A GPC sample is collected after 5 min by briefly removing the vial cap and withdrawing approximately 0.10 g of the polyol. The DBSA-treated polyol is re-capped until the next sample is to be collected. The sample is diluted with 10.0 g uninhibited THF and filtered through a 0.45 µm PTFE syringe filter for GPC analysis. The GPC analysis for the value of the Polyether Acetal Polyol Area % is summarized in Table VII.

TABLE VII

GPC Results

| Example No. | Acid (mmol) | Temp. (° C.) | Treatment Time (min) | Water (wt %) | Stirring Rate (rpm) | Polyether Acetal Polyol Area % (by GPC) |
|---|---|---|---|---|---|---|
| Inv. Ex. 2 | DBSA (0.006) | 100 | 5 | 5.2 | 750 | 0.80 |

Inventive Example 3

Polyol A (4.75 g) and a 12 mm magnetic stir bar are added to a 20 mL borosilicate glass scintillation vial. The polyol is stirred at 750 rpm and heated in a temperature-controlled aluminum reaction block at 100° C. for 30 min. Next, dodecylbenzene sulfonic acid (DBSA) is added streamwise as a stock solution in water (0.25 g; stock solution: 10.0 mg DBSA and 5.0 g deionized water), and the polyol solution is capped and stirred at 750 rpm and 100° C. for 5 min. A GPC sample is collected after 5 min by briefly removing the vial cap and withdrawing approximately 0.10 g of the polyol. The sample is diluted with 10.0 g uninhibited THF and filtered through a 0.45 µm PTFE syringe filter for GPC analysis. The GPC analysis for the value of the Polyether Acetal Polyol Area % is summarized in Table VIII.

TABLE VIII

GPC Results

| Example No. | Acid (mmol) | Temp. (° C.) | Treatment Time (min) | Water (wt %) | Stirring Rate (rpm) | Polyether Acetal Polyol Area % (by GPC) |
|---|---|---|---|---|---|---|
| Inv. Ex. 3 | DBSA (0.002) | 100 | 5 | 5.2 | 750 | 1.55 |

Inventive Example 4

Polyol A (4.75 g) and a 12 mm magnetic stir bar are added to a 20 mL borosilicate glass scintillation vial. The polyol is stirred at 750 rpm and heated in a temperature-controlled aluminum reaction block at 80° C. for 30 min. Next, DBSA is added streamwise as a stock solution in water (0.25 g; stock solution: 20.0 mg DBSA and 5.0 g deionized water), and the polyol solution is capped and stirred at 750 rpm and 80° C. for 30 min. GPC samples are collected after 5 min and 30 min by briefly removing the vial cap and withdrawing approximately 0.10 g of the polyol. The samples are diluted with 10.0 g uninhibited THF and filtered through 0.45 µm PTFE syringe filters for GPC analysis. The GPC analysis for the value of the Polyether Acetal Polyol Area % after 5 and 30 min is summarized in Table IX.

TABLE IX

GPC Results

| Example No. | Acid (mmol) | Temp. (° C.) | Treatment Time (min) | Water (wt %) | Stirring Rate (rpm) | Polyether Acetal Polyol Area % (by GPC) |
|---|---|---|---|---|---|---|
| Inv. Ex. 4 | DBSA (0.003) | 80 | 5<br>30 | 5.2 | 750 | 2.73<br>1.16 |

Comparative Example C (Benzenesulfonic Acid Used Instead of DBSA)

Polyol A (4.75 g) and a 12 mm magnetic stir bar are added to a 20 mL borosilicate glass scintillation vial. The polyol is stirred at 350 rpm and heated in a temperature-controlled aluminum reaction block at 90° C. for 30 min. Next, benzenesulfonic acid (BSA) monohydrate is added streamwise as a stock solution in water (0.25 g; stock solution: 10.8 mg BSA monohydrate and 5.0 g deionized water), and the polyol solution is capped and stirred at 350 rpm and 90° C. for 5 min. A GPC sample is collected after 5 min by briefly removing the vial cap and withdrawing approximately 0.10 g of the polyol. The sample is diluted with 10.0 g uninhibited THF and filtered through a 0.45 µm PTFE, syringe filter for GPC analysis. The GPC analysis for the value of the Polyether Acetal Polyol Area % is summarized in Table X.

TABLE X

GPC Results

| Example No. | Acid (mmol) | Temp. (° C.) | Treatment Time (min) | Water (wt %) | Stirring Rate (rpm) | Polyether Acetal Polyol Area % (by GPC) |
|---|---|---|---|---|---|---|
| Comp. Ex. C | BSA (0.003) | 90 | 5 | 5.2 | 350 | 6.00 |

Comparative Example D (pTSA Used Instead of DBSA)

Polyol A (4.75 g) and a 12 mm magnetic stir bar are added to a 20 mL borosilicate glass scintillation vial. The polyol is stirred at 350 rpm and heated in a temperature-controlled aluminum reaction block at 90° C. for 30 min. Next, para toluenesulfonic acid (pTSA) monohydrate is added streamwise as a stock solution in water (0.25 g; stock solution: 11.6 mg pTSA monohydrate and 5.0 g deionized water), and the polyol solution is capped and stirred at 350 rpm and 90° C. for 5 min. A GPC sample is collected after 5 min by briefly removing the vial cap and withdrawing approximately 0.10 g of the polyol. The sample is diluted with 10.0 g uninhibited THF and filtered through a 0.45 μm PTFE syringe filter for GPC analysis. The GPC analysis for the value of the Polyether Acetal Polyol Area % is summarized in Table XI.

TABLE XI

GPC Results

| Example No. | Acid (mmol) | Temp. (° C.) | Treatment Time (min) | Water (wt %) | Stirring Rate (rpm) | Polyether Acetal Polyol Area % (by GPC) |
|---|---|---|---|---|---|---|
| Comp. Ex. C | pTSA (0.003) | 90 | 5 | 5.2 | 350 | 5.22 |

Comparative Example E (4-Hydroxybenzene Sulfonic Acid Used Instead of DBSA)

Polyol A (4.75 g) and a 12 mm magnetic stir bar are added to a 20 mL borosilicate glass scintillation vial. The polyol is stirred at 350 rpm and heated in a temperature-controlled aluminum reaction block at 90° C. for 30 min. Next, 4-hydroxybenzene sulfonic acid (60% solution in water) is added streamwise as a stock solution in water (0.25 g; stock solution: 19.7 mg 60% 4-hydroxybenzene sulfonic acid solution and 5.0 g deionized water), and the polyol solution is capped and stirred at 350 rpm and 90° C. for 5 min. A GPC sample is collected after 5 min by briefly removing the vial cap and withdrawing approximately 0.10 g of the polyol. The sample is diluted with 10.0 g uninhibited THF and filtered through a 0.45 μm PTFE syringe filter for GPC analysis. The GPC analysis for the value of the Polyether Acetal Polyol Area % is summarized in Table XII.

TABLE XII

GPC Results

| Example No. | Acid (mmol) | Temp. (° C.) | Treatment Time (min) | Water (wt %) | Stirring Rate (rpm) | Polyether Acetal Polyol Area % (by GPC) |
|---|---|---|---|---|---|---|
| Comp. Ex. C | 4-hydroxy-benzene sulfonic acid (0.003) | 90 | 5 | 5.2 | 350 | 6.32 |

Comparative Example F (4-Chlorobenzene Sulfonic Acid Used Instead of DBSA)

Polyol A (4.75 g) and a 12 mm magnetic stir bar are added to a 20 mL borosilicate glass scintillation vial. The polyol is stirred at 350 rpm and heated in a temperature-controlled aluminum reaction block at 90° C. for 30 min. Next, 4-chlorobenzene sulfonic acid (90%) is added streamwise as a stock solution in water (0.25 g; stock solution: 13.1 mg 90% 4-chlorobenzene sulfonic acid solution and 5.0 g deionized water), and the polyol solution is capped and stirred at 350 rpm and 90° C. for 5 min. A GPC sample is collected after 5 min by briefly removing the vial cap and withdrawing approximately 0.10 g of the polyol. The sample is diluted with 10.0 g uninhibited THF and filtered through a 0.45 μm PTFE syringe filter for GPC analysis. The GPC analysis for the value of the Polyether Acetal Polyol Area % is summarized in Table XIII

TABLE XIII

GPC Results

| Example No. | Acid (mmol) | Temp. (° C.) | Treatment Time (min) | Water (wt %) | Stirring Rate (rpm) | Polyether Acetal Polyol Area % (by GPC) |
|---|---|---|---|---|---|---|
| Comp. Ex. C | 4-chloro-benzene sulfonic acid (0.003) | 90 | 5 | 5.2 | 350 | 4.87 |

Comparative Example G (Ethanesulfonic Acid Used Instead of DBSA)

Polyol A (4.75 g) and a 12 mm magnetic stir bar are added to a 20 mL borosilicate glass scintillation vial. The polyol is stirred at 350 rpm and heated in a temperature-controlled aluminum reaction block at 90° C. for 30 min. Next, ethanesulfonic acid is added streamwise as a stock solution in water (0.25 g; stock solution: 6.7 mg ethanesulfonic acid and 5.0 g deionized water), and the polyol solution is capped and stirred at 350 rpm and 90° C. for 5 min. A GPC sample is collected after 5 min by briefly removing the vial cap and withdrawing approximately 0.10 g of the polyol. The sample is diluted with 10.0 g uninhibited THF and filtered through a 0.45 μm PTFE syringe filter for GPC analysis. The GPC analysis for the value of the Polyether Acetal Polyol Area % is summarized in Table XIV.

TABLE XIV

GPC Results

| Example No. | Acid (mmol) | Temp. (° C.) | Treatment Time (min) | Water (wt %) | Stirring Rate (rpm) | Polyether Acetal Polyol Area % (by GPC) |
|---|---|---|---|---|---|---|
| Comp. Ex. C | Ethane-sulfonic acid (0.003) | 90 | 5 | 5.2 | 350 | 6.05 |

Inventive Example 5

Polyol A (4.75 g) and a 12 mm magnetic stir bar are added to a 20 mL borosilicate glass scintillation vial. The polyol is stirred at 350 rpm and heated in a temperature-controlled aluminum reaction block at 90° C. for 30 min. Next, DBSA is added streamwise as a stock solution in water (0.25 g; stock solution: 20.0 mg DBSA and 5.0 g deionized water), and the polyol solution is capped and stirred at 350 rpm and 90° C. for 5 min. A GPC sample is collected after 5 min by briefly removing the vial cap and withdrawing approximately 0.10 g of the polyol. The sample is diluted with 10.0 g uninhibited THF and filtered through a 0.45 μm PTFE syringe filter for GPC analysis. The GPC analysis for the value of the Polyether Acetal Polyol Area % is summarized in Table XV.

TABLE XV

GPC Results

| Example No. | Acid (mmol) | Temp. (° C.) | Treatment Time (min) | Water (wt %) | Stirring Rate (rpm) | Polyether Acetal Polyol Area % (by GPC) |
|---|---|---|---|---|---|---|
| Inv. Ex. 5 | DBSA (0.003) | 90 | 5 | 5.2 | 350 | 1.58 |

OTHER EMBODIMENTS

One embodiment of the present invention includes a process for purifying a polyether polyol having a first residual level of acetal linkages present in the polyether polyol including the step of treating the polyether polyol with a mixture of: (i) an alkyl- or an arylsulfonic acid catalyst, wherein the catalyst includes a substituted or unsubstituted alkyl group of at least 6 carbon atoms, and (ii) water; wherein the concentrations of components (i) and (ii) are sufficient to reduce the first residual level of acetal linkages present in the polyether polyol to a reduced second level of acetal linkages present in the polyether polyol. For example, in an exemplary embodiment, the sulfonic acid catalyst is an alkylsulfonic acid catalyst. In another exemplary embodiment, the sulfonic acid catalyst is an arylsulfonic acid catalyst.

The process described above, wherein the C6 to C18 alkylsulfonic acid or C6 to C18 alkylated arylsulfonic acid concentration is from 0.0001 mol to 0.005 mol of C6 to C18 alkylsulfonic acid or C6 to C18 alkylated arylsulfonic acid per kilogram of polyether polyol.

Another embodiment of the process described above, further includes the step of stirring a biphasic mixture which is generated by a sufficient concentration of water. In an exemplary embodiment, the water concentration is from 0.5 weight percent to 20 weight percent.

Still another embodiment of the process described above, further includes the steps of: The process of claim 1, including the steps of: (A) treating the polyether polyol with a mixture of: (i) an alkyl- or an arylsulfonic acid catalyst, wherein the catalyst includes a carbon atom chain length of at least 6 carbon atoms, and (ii) water; and (B) heating the biphasic mixture to reduce residual levels of acetal linkages present in the polyether polyol. In one exemplary embodiment, the treating step (A) includes a treatment reaction time of ≤5 min.

Yet another embodiment of the process of the present invention relates to a polyether polyol product, wherein the polyether product is an acid-finished polyether polyol produced by any of the processes described above.

Even still another embodiment of the present invention relates to a polyurethane product including a reaction product of the polyether polyol and an isocyanate, wherein the polyether polyol is an acid-finished polyether polyol produced by any one of the processes described above.

What is claimed is:

1. A process for purifying a polyether polyol, the process comprising:
   treating the polyether polyol with a mixture of (i) a sulfonic acid catalyst, the catalyst including a substituted or unsubstituted alkyl group of at least 6 carbon atoms, and (ii) water to reduce residual levels of acetal linkages present in the polyether polyol.

2. The process of claim 1, wherein the sulfonic acid catalyst includes one of the following generic chemical structures: $R^5$—$SO_3H$ or $R^5$—$ArSO_3H$, wherein $R^5$ is a substituted or unsubstituted alkyl group of 6 to 18 carbon atoms and Ar is an aryl group.

3. The process of claim 1, wherein the concentration of water is sufficient to generate a biphasic mixture.

4. The process of claim 1, includes:
   treating the polyether polyol with the mixture; and
   heating a biphasic mixture to reduce residual levels of acetal linkages present in the polyether polyol.

5. The process of claim 1, wherein a residual concentration of polyether acetal polyol present in the polyether polyol product produced by the process is reduced to less than 1.0 weight percent.

6. The process of claim 1, wherein the sulfonic acid catalyst is dodecylbenzene sulfonic acid.

7. The process of claim 4, wherein a treatment temperature of the treating step (A) is from 60° C. to 140° C.

8. The process of claim 4, wherein a treatment reaction time of the treating step (A) is less than or equal to 30 minutes.

9. The process of claim 1, wherein the polyether polyol is produced using a Lewis acidic alkoxylation catalyst; and wherein the polyether polyol is a non-finished polyol.

10. The process of claim 9, wherein the Lewis acid alkoxylation catalyst is a compound having a general formula of M $R^1)_1(R^2)_1(R^3)_1(R^4)_{0\ or\ 1}$, whereas M is boron, aluminum, indium, bismuth or erbium, $R^1$, $R^2$, $R^3$, and $R^4$ are each independent, $R^1$ includes a first fluoro, chloro, or fluoroalkyl-substituted phenyl group, $R^2$ includes a second fluoro, chloro, or fluoroalkyl-substituted phenyl group, $R^3$ includes a third fluoro, chloro, or fluoroalkyl-substituted phenyl group or a first functional group or functional polymer group, optional $R^4$ is a second functional group or functional polymer group.

\* \* \* \* \*